United States Patent
Achten et al.

(10) Patent No.: US 11,400,646 B2
(45) Date of Patent: Aug. 2, 2022

(54) ADDITIVE PRODUCTION PROCESS USING A MIXED THERMOPLASTIC CONSTRUCTION MATERIAL

(71) Applicant: COVESTRO DEUTSCHLAND AG, Leverkusen (DE)

(72) Inventors: Dirk Achten, Leverkusen (DE); Thomas Büsgen, Leverkusen (DE); Bettina Mettmann, Dormagen (DE); Michael Kessler, Cologne (DE); Peter Reichert, Dormagen (DE); Roland Wagner, Leverkusen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 163 days.

(21) Appl. No.: 16/605,977

(22) PCT Filed: Apr. 23, 2018

(86) PCT No.: PCT/EP2018/060299
§ 371 (c)(1),
(2) Date: Oct. 17, 2019

(87) PCT Pub. No.: WO2018/197392
PCT Pub. Date: Nov. 1, 2018

(65) Prior Publication Data
US 2020/0047410 A1    Feb. 13, 2020

(30) Foreign Application Priority Data
Apr. 24, 2017 (EP) .................................. 17167681

(51) Int. Cl.
*B29C 64/153* (2017.01)
*C08L 75/06* (2006.01)
*B33Y 10/00* (2015.01)
*B33Y 70/00* (2020.01)

(52) U.S. Cl.
CPC ............ *B29C 64/153* (2017.08); *C08L 75/06* (2013.01); *B33Y 10/00* (2014.12); *B33Y 70/00* (2014.12)

(58) Field of Classification Search
CPC ....... B29C 64/153; C08L 75/06; B33Y 10/00; B33Y 70/00; C08G 18/664
See application file for complete search history.

(56) References Cited

U.S. PATENT DOCUMENTS

| | | | |
|---|---|---|---|
| 6,110,411 A * | 8/2000 | Clausen | B33Y 70/00 264/497 |
| 2017/0129177 A1* | 5/2017 | Hattig | C08G 18/244 |

FOREIGN PATENT DOCUMENTS

| | | | |
|---|---|---|---|
| DE | 102010062875 A1 | 6/2012 | |
| WO | WO-2015197515 A1 * | 12/2015 | ......... C08G 18/4238 |

OTHER PUBLICATIONS

Ziegelmeier, Stefan et al.: "An experimental study into the effects of bulk and flow behaviour of laser sintering polymer powders on resulting part properties", Journal of Materials Processing Technology, Elsevier, NL, vol. 215, pp. 239-250, Aug. 2, 2014.
International Search Report, PCT/EP2018/060299, dated Jun. 7, 2018, Authorized officer: Martin Bergmeier.

* cited by examiner

*Primary Examiner* — Larry W Thrower
(74) *Attorney, Agent, or Firm* — Jed C. Benson

(57) ABSTRACT

The present invention relates to a method for producing an object, comprising the step of producing the object according to an additive production process from a construction material, wherein the construction material comprises a mixture of a plurality of powdery thermoplastic materials which are different from one another due to at least one mechanical property and at least one thermoplastic material is a thermoplastic polyurethane material. The invention also relates to an object obtained according to said method.

12 Claims, No Drawings

ADDITIVE PRODUCTION PROCESS USING A MIXED THERMOPLASTIC CONSTRUCTION MATERIAL

CROSS-REFERENCE TO RELATED APPLICATION

This application is a national stage application under 35 U.S.C. § 371 of PCT/EP2018/060299, filed Apr. 23, 2018, which claims the benefit of European Application No. 17167681, filed Apr. 24, 2017, each of which is incorporated herein by reference.

FIELD

The present invention relates to a process for producing an article, comprising the step of producing the article by means of an additive manufacturing method from a construction material, wherein the construction material comprises a mixture of a multitude of pulverulent thermoplastic materials that each differ from one another by at least one mechanical property, and at least one thermoplastic material is a thermoplastic polyurethane material. The invention likewise relates to an article obtainable by the process.

BACKGROUND

One aspect in which the use of multiple materials in an additive manufacturing method, also referred to as multimaterial 3D printing, is known in the prior art is in connection with support structures that are to be removed later. For instance, the article to be produced itself may have been constructed from a water-insoluble material and the support structures from a water-soluble material. The actual article is then obtained by leaching out the support structures.

EP 1 460 108 A1 discloses a sinter powder for selective laser sintering, wherein the powder includes at least one polyamide and at least one poly(N-methylmethacrylimide) (PMMI), a polymethylmethacrylate (PMMA) and/or a PMMI-PMMA copolymer.

When different thermoplastic materials are to be used in a multimaterial 3D printing method, the processing parameters during the printing operation must encompass a range that relates to all the material used. For example, the processing temperature must be chosen such that all material melts. In the case of polyamides, however, the melting points of the material are in some cases far apart: PA 6.6 (260° C.), PA 6.10 (240° C.), PA 6 (220° C.), PA 6.12 (218° C.), PA 11 (198° C.) and PA 12 (178° C.). Thus, certain limits are set on fine adjustment of the construction material by mixing of various polyamides.

SUMMARY

It is an object of the present invention to at least partly overcome at least one disadvantage of the prior art. It is a further object of the present invention to specify an additive manufacturing method in which the mechanical and/or chemical properties of the article produced thereby can be varied with simultaneously maximum cohesive bonding of the individual construction slices within the article. It was a further object of the invention to be able to produce an article with maximum cost efficiency and/or individualization and/or resource conservation.

The object is achieved in accordance with the invention as claimed in the independent claim(s). Advantageous developments are specified in the subsidiary claims. They may be combined as desired, unless the opposite is unambiguously apparent from the context.

DETAILED DESCRIPTION

In a process for producing an article, comprising the step of producing the article by means of an additive manufacturing method from a construction material, the construction material comprises a mixture of a multitude of pulverulent thermoplastic materials that each differ from one another by at least one mechanical property, and at least one thermoplastic material is a thermoplastic polyurethane material.

The distinguishing mechanical property may be selected, for example, from the group consisting of: Shore hardness (DIN ISO 7619-1), breaking strength (DIN 53504, 200 mm/min), elongation at break (DIN 53504, 200 mm/min), tensile stress at 100% elongation (DIN 53504, 200 mm/min), tensile stress at 300% elongation (DIN 53504, 200 mm/min), resilience (ISO 4662) or a combination of at least two of these.

The construction material may comprise, for example, 2, 3, 4, 5, 6, 7, 8, 9 or 10 pulverulent thermoplastic materials that differ in at least one mechanical property. Examples of suitable proportions by weight, based in each case on the total weight of the construction material, and where the sum total of the proportions by weight adds up to ≤100% by weight, are (TPM=thermoplastic material):

| 1st TPM [% by wt.] | 2nd TPM [% by wt.] | 3rd TPM [% by wt.] | 4th TPM [% by wt.] |
|---|---|---|---|
| ≥10-≤90 | ≥10-≤90 | — | — |
| ≥30-≤70 | ≥30-≤70 | — | — |
| ≥40-≤60 | ≥40-≤60 | — | — |
| ≥10-≤80 | ≥10-≤80 | ≥10-≤80 | — |
| ≥10-≤70 | ≥10-≤70 | ≥20-≤80 | — |
| ≥40-≤59 | ≥40-≤59 | ≥1-≤20 | — |
| ≥10-≤70 | ≥10-≤70 | ≥10-≤70 | ≥10-≤70 |
| ≥20-≤70 | ≥10-≤60 | ≥10-≤60 | ≥10-≤60 |
| ≥30-≤78 | ≥20-≤68 | ≥1-≤49 | ≥1-≤49 |

As well as the thermoplastic materials, the construction material may contain further additives such as fillers, stabilizers and the like. The total content of additives in the construction material may, for example, be ≥0.1% by weight to ≤50% by weight, preferably ≥0.5% by weight to ≤30% by weight.

Prior to commencement of the production of the article by means of the additive manufacturing method, the construction material may be provided in the form of a mixture of the different thermoplastic materials. Useful mixtures include, for example, powder mixtures for laser sintering methods. It is alternatively possible that the construction material is mixed in situ from the various thermoplastic materials during the production of the article by means of the additive manufacturing method. Preferably, in this embodiment, the mixing ratio of the different thermoplastic materials is variable in time or space, in relation to individual slices or in relation to individual volume elements (voxels) of a slice. In that case, it is possible to produce articles having three-dimensionally varying mechanical properties.

It is preferable that at least 90% by weight of the particles of the pulverulent materials used have a particle diameter of ≤0.25 mm, preferably ≤0.2 mm, more preferably ≤0.15 mm.

Polyisocyanates suitable for the preparation of the thermoplastic polyurethanes usable in the process of the invention may be symmetric polyisocyanates, asymmetric polyisocyanates or mixtures thereof. Examples of symmetric polyisocyanates are 4,4'-MDI, decane diisocyanate, hexane diisocyanate (HDI), pentane diisocyanate (PDI) and butane diisocyanate (BDI).

In the case of asymmetric polyisocyanates, the steric environment of one NCO group in the molecule is different than the steric environment of a further NCO group. In that case, one isocyanate group reacts more quickly with groups reactive toward isocyanates, for example OH groups, while the remaining isocyanate group is less reactive. One consequence of the asymmetric construction of the polyisocyanate is that the polyurethanes formed with these polyisocyanates also have a less linear structure.

Examples of suitable asymmetric polyisocyanates are 2,2,4-trimethylhexamethylene diisocyanate, ethylethylene diisocyanate, asymmetric isomers of dicyclohexylmethane diisocyanate ($H_{12}$-MDI), asymmetric isomers of 1,4-diisocyanatocyclohexane, asymmetric isomers of 1,3-diisocyanatocyclohexane, asymmetric isomers of 1,2-diisocyanatocyclohexane, asymmetric isomers of 1,3-diisocyanatocyclopentane, asymmetric isomers of 1,2-diisocyanatocyclopentane, asymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), and derivatives of the recited diisocyanates, especially dimerized or trimerized types.

Preference is given to 4,4'-MDI, $H_{12}$-MDI, HDI, PDI or a mixture comprising IPDI and/or $H_{12}$-MDI and HDI and/or PDI as polyisocyanate component.

The polyol component may contain a polyol selected from the group of: polyether polyols, polyester polyols, polyetherester polyols, polycarbonate polyols or a combination of at least two of these.

In the reaction to give the polyurethanes, it is optionally also possible to use diols in the molecular weight range from ≥62 to ≤600 g/mol as chain extenders.

In a preferred embodiment, the construction material comprises a first pulverulent thermoplastic material and a second pulverulent thermoplastic material, where the first pulverulent thermoplastic material is a first polyurethane material and the second pulverulent thermoplastic material is a second polyurethane material, a polycarbonate material, a polyester material or a polyamide material. In this embodiment, it is preferable that the first pulverulent thermoplastic material is present in an amount of ≥40% by weight, based on the total weight of the construction material.

In the case of use of a first and second polyurethane material, thermoplastic polyurethanes have the advantage that materials in a comparatively small window of processing conditions, especially of processing temperature, a wide range of mechanical and/or chemical properties is available. For instance, it is possible to jointly process different thermoplastic polyurethanes having a Shore hardness (DIN ISO 7619-1) of ≥40 A to ≤90 D within a temperature range from ≥180° C. to ≤260° C., where the material obtained after the melting and cooling preferably has a Shore hardness between the greatest and smallest hardness of the polyurethanes used and/or has an elongation at break between the greatest and smallest elongation at break of the polyurethanes used. This enables fine adjustment of the polyurethane properties, which can of course also vary within the article to be produced itself. As a result of the chemical compatibility of the polyurethanes with one another, it is possible in the process of the invention to characterize the construction material that has been melted and cooled down again at least at the particle interface as a polymer blend that differs from conventional polymer blends in that boundary regions arise between the particles that differ not just physically as a mixture but also chemically from the materials within the particles used. In polyurethanes as representatives of the addition polymers, at the processing temperatures used, reversible openings the urethane groups can open reversibly and transurethanizations can occur. If, for example, two particles alongside one another are melted and one particle is constructed from a first polyurethane based on a first isocyanate and a first polyol and the other particle is constructed from a second polyurethane based on a second isocyanate and a second polyol, there may also be polyurethanes on the basis of the first isocyanate and the second polyol and on the basis of the second isocyanate and the first polyol in the contact zone as a result of transurethanizations.

By contrast with customary fused polymer blends, the ratio of the physically and chemically mixed polymer phases can be controlled very precisely via the particle sizes and sintering temperatures, resulting in polymer blends having novel, highly controlled properties not obtainable via conventional melt blends.

These properties that are preferably obtained via mixing of compatible interface-reactive (meaning the transurethanization reaction) components can be inferred from the improved strength, abrasion resistance and preferably the linear ratio of elongations at break. These effects can be adjusted via controlled conditioning or process-related thermal stress in the SLS construction space close to the melting temperature of the mixed phases involved. Preferably, the mixed phases undergo thermal stresses of ≥50° C., more preferably ≥40° C. and most preferably ≥30° C. below the melting temperature for at least 1 minute, preferably at least 3 minutes, more preferably at least 20 minutes and most preferably at least 30 minutes.

Polycarbonate (PC) polymers as the second thermoplastic material may be either homopolycarbonates or copolycarbonates; the polycarbonates may be linear or branched in a known manner. According to the invention, it is also possible to use mixtures of polycarbonates. The polycarbonates may be aromatic, aliphatic or mixed aromatic/aliphatic polycarbonate polymers. The polycarbonates are prepared in a known manner from diols, carbonic acid derivatives, and optionally chain terminators and branching agents.

Suitable polyamides for the second thermoplastic material are especially PA 6, PA 6.6, PA 6.9, PA 6.12, PA 11, PA 12, PA 4.6, PA 12.12, PA 6.12 and PA 10.10.

Suitable polyesters for the second thermoplastic material are especially polybutylene terephthalate (PBT), polycaprolactones (PCL), polylactic acid (PLA), polyhydroxybutyrate (PHB), polyglycolic acid (PGA) and polyethylene adipate (PEA).

In a further preferred embodiment, the construction material comprises a multitude of pulverulent thermoplastic polyurethane materials that differ from one another by their Shore hardness (DIN ISO 7619-1). The construction material may comprise, for example, 2, 3, 4, 5, 6, 7, 8, 9 or 10 pulverulent thermoplastic polyurethane materials that differ in their Shore hardness. Examples of suitable proportions by weight, based in each case on the total weight of the construction material, and where the sum total of the proportions by weight adds up to ≤100% by weight, are (TPU=thermoplastic polyurethane):

| 1st TPU [% by wt.] | 2nd TPU [% by wt.] | 3rd TPU [% by wt.] | 4th TPU [% by wt.] |
|---|---|---|---|
| ≥10-≤90 | ≥10-≤90 | — | — |
| ≥30-≤70 | ≥30-≤70 | — | — |
| ≥40-≤60 | ≥40-≤60 | — | — |
| ≥10-≤80 | ≥10-≤80 | ≥10-≤80 | — |
| ≥10-≤70 | ≥10-≤70 | ≥20-≤80 | — |
| ≥40-≤59 | ≥40-≤59 | ≥1-≤20 | — |
| ≥10-≤70 | ≥10-≤70 | ≥10-≤70 | ≥10-≤70 |
| ≥20-≤70 | ≥10-≤60 | ≥10-≤60 | ≥10-≤60 |
| ≥30-≤78 | ≥20-≤68 | ≥1-≤49 | ≥1-≤49 |

In a further preferred embodiment, the construction material comprises a first pulverulent thermoplastic polyurethane material and a second pulverulent thermoplastic polyurethane material, where the first pulverulent thermoplastic polyurethane material has a Shore hardness (DIN ISO 7619-1) of ≥40 A to ≤90 D, the second pulverulent thermoplastic polyurethane material has a Shore hardness (DIN ISO 7619-1) of ≥40 A to ≤90 D, and the difference in Shore hardnesses between the first and second pulverulent thermoplastic polyurethane material is ≥2 A to ≤40 A and/or ≥2 D to ≤60 D.

One example of such a construction material suitable in accordance with the invention comprises a first pulverulent thermoplastic polyurethane material having a Shore hardness (DIN ISO 7619-1) of ≥70 A to ≤80 A and a second pulverulent thermoplastic polyurethane material having a Shore hardness (DIN ISO 7619-1) of ≥85 A to ≤95 A. The difference in Shore hardnesses between the first and second pulverulent thermoplastic polyurethane material is ≥5 A to ≤25 A.

A further example of such a construction material suitable in accordance with the invention comprises a first pulverulent thermoplastic polyurethane material having a Shore hardness (DIN ISO 7619-1) of ≥60 A to ≤70 A and a second pulverulent thermoplastic polyurethane material having a Shore hardness (DIN ISO 7619-1) of ≥80 A to ≤90 A. The difference in Shore hardnesses between the first and second pulverulent thermoplastic polyurethane material is ≥10 A to ≤20 A.

In a further preferred embodiment, the construction material comprises a first pulverulent thermoplastic polyurethane material, a second pulverulent thermoplastic polyurethane material and a third pulverulent thermoplastic polyurethane material, where the first pulverulent thermoplastic polyurethane material has a Shore hardness (DIN ISO 7619-1) of ≥40 A to ≤90 D, the second pulverulent thermoplastic polyurethane material has a Shore hardness (DIN ISO 7619-1) of ≥40 A to ≤90 D, the third pulverulent thermoplastic polyurethane material has a Shore hardness (DIN ISO 7619-1) of ≥40 A to ≤90, the difference in Shore hardnesses between the first and second pulverulent thermoplastic polyurethane material is ≥2 A to ≤40 A and/or ≥2D to ≤60 D and the difference in Shore hardnesses between the second and third pulverulent thermoplastic polyurethane material is ≥2 A to ≤40 A and/or ≥2D to ≤60 D.

One example of such a construction material suitable in accordance with the invention comprises a first pulverulent thermoplastic polyurethane material having a Shore hardness (DIN ISO 7619-1) of ≥60 A to ≤70 A, a second pulverulent thermoplastic polyurethane material having a Shore hardness (DIN ISO 7619-1) of ≥75 A to ≤85 A, and a third pulverulent thermoplastic polyurethane material having a Shore hardness (DIN ISO 7619-1) of ≥90 A to ≤90 D. The difference in Shore hardnesses between the first and second pulverulent thermoplastic polyurethane material is ≥2 A to ≤40 A, and the difference in Shore hardnesses between the second and third pulverulent thermoplastic polyurethane material is ≥2 A to ≤60 D.

A further example of such a construction material suitable in accordance with the invention comprises a first pulverulent thermoplastic polyurethane material having a Shore hardness (DIN ISO 7619-1) of ≥60 A to ≤65 A, a second pulverulent thermoplastic polyurethane material having a Shore hardness (DIN ISO 7619-1) of ≥70 A to ≤75 A, and a third pulverulent thermoplastic polyurethane material having a Shore hardness (DIN ISO 7619-1) of ≥80 A to ≤90 A. The difference in Shore hardnesses between the first and second pulverulent thermoplastic polyurethane material is ≥5 A to ≤15 A, and the difference in Shore hardnesses between the second and third pulverulent thermoplastic polyurethane material is ≥5 A to ≤15 A.

In a further preferred embodiment, the construction material comprises a multitude of pulverulent thermoplastic polyurethane materials that differ from one another by their elongation at break (DIN 53504, 200 mm/min). The construction material may comprise, for example, 2, 3, 4, 5, 6, 7, 8, 9 or 10 thermoplastic polyurethane materials that differ in their elongation at break.

In a further preferred embodiment, the construction material comprises a first pulverulent thermoplastic polyurethane material and a second pulverulent thermoplastic polyurethane material, where the first pulverulent thermoplastic polyurethane material has an elongation at break (DIN 53504, 200 mm/min) of ≥200% to ≤800%, the second pulverulent thermoplastic polyurethane material has an elongation at break (DIN 53504, 200 mm/min) of ≥100% to ≤400%, and the difference in elongations at break between the first and second pulverulent thermoplastic polyurethane material is ≥50 percentage points to ≤700 percentage points.

One example of such a construction material suitable in accordance with the invention comprises a first pulverulent thermoplastic polyurethane material having an elongation at break (DIN 53504, 200 mm/min) of ≥300% to ≤500% and a second pulverulent thermoplastic polyurethane material having an elongation at break (DIN 53504, 200 mm/min) of ≥100% to ≤400%. The difference in elongations at break between the first and second pulverulent thermoplastic polyurethane material is ≥50 percentage points to ≤400 percentage points.

A further example of such a construction material suitable in accordance with the invention comprises a first pulverulent thermoplastic polyurethane material having an elongation at break (DIN 53504, 200 mm/min) of ≥150% to ≤250% and a second pulverulent thermoplastic polyurethane material having an elongation at break (DIN 53504, 200 mm/min) of ≥200% to ≤450%. The difference in elongations at break between the first and second pulverulent thermoplastic polyurethane material is ≥50 percentage points to ≤300 percentage points.

In a further preferred embodiment, the construction material comprises a first pulverulent thermoplastic polyurethane material, a second pulverulent thermoplastic polyurethane material and a third pulverulent thermoplastic polyurethane material, where the first pulverulent thermoplastic polyurethane material has an elongation at break (DIN 53504, 200 mm/min) of ≥200% to ≤600%, the second pulverulent thermoplastic polyurethane material has an elongation at break (DIN 53504, 200 mm/min) of ≥200% to ≤600%, the third pulverulent thermoplastic polyurethane material has an elongation at break (DIN 53504, 200 mm/min) of ≥200% to ≤600%, the difference in elongations at break between the first and second pulverulent thermoplastic polyurethane material is ≥50 percentage points to ≤100 percentage points and the difference in elongations at break between the second and third pulverulent thermoplastic polyurethane material is ≥50 percentage points to ≤100 percentage points.

One example of such a construction material suitable in accordance with the invention comprises a first pulverulent thermoplastic polyurethane material having an elongation at break (DIN 53504, 200 mm/min) of ≥400% to ≤500%, a second pulverulent thermoplastic polyurethane material having an elongation at break (DIN 53504, 200 mm/min) of ≥300% to ≤400% and a third pulverulent thermoplastic polyurethane material having an elongation at break (DIN 53504, 200 mm/min) of ≥200% to ≤300%. The difference in elongations at break between the first and second pulverulent thermoplastic polyurethane material is ≥50 percentage points to ≤100 percentage points, and the difference in elongations at break between the second and third pulverulent thermoplastic polyurethane material is ≥50 percentage points to ≤100 percentage points.

A further example of such a construction material suitable in accordance with the invention comprises a first thermoplastic polyurethane material having an elongation at break (DIN 53504, 200 mm/min) of ≥430% to ≤470%, a second thermoplastic polyurethane material having an elongation at break (DIN 53504, 200 mm/min) of ≥330% to ≤370% and a third thermoplastic polyurethane material having an elongation at break (DIN 53504, 200 mm/min) of ≥230% to ≤270%. The difference in elongations at break between the first and second thermoplastic polyurethane material is ≥70 percentage points to ≤85 percentage points, and the difference in elongations at break between the second and third thermoplastic polyurethane material is ≥70 percentage points to ≤85 percentage points.

In a further preferred embodiment, the construction material, with regard to its fusible components, has a melting range (DSC, differential scanning calorimetry; 2nd heating at heating rate 20 K/min.) within the temperature range from ≥30° C. to ≤90° C. The melting range is preferably within a temperature range from ≥35° C. to ≤80° C. and more preferably from ≥45° C. to ≤70° C. In the DSC analysis for determination of the melting range, the material is subjected to the following temperature cycle: 1 minute at −60° C., then heating to 240° C. at 20 kelvin/minute, then cooling to −60° C. at 50 kelvin/minute, then 1 minute at −60° C., then heating to 150° C. at 20 kelvin/minute.

It is possible that the temperature interval between the start of the melting operation and the end of the melting operation as determinable by the above DSC protocol is ≤80° C., preferably ≤60° C. and more preferably ≤50° C.

In a further preferred embodiment, the construction material, with regard to its fusible components, has a melting range (DSC, differential scanning calorimetry; 2nd heating at heating rate 20 K/min.) within the temperature range from ≥100° C. to ≤240° C. The melting range is preferably within a temperature range from ≥110° C. to ≤230° C. and more preferably from ≥120° C. to ≤220° C. In the DSC analysis for determination of the melting range, the material is subjected to the following temperature cycle: 1 minute at −60° C., then heating to 260° C. at 20 kelvin/minute, then cooling to −60° C. at 50 kelvin/minute, then 1 minute at −60° C., then heating to 260° C. at 20 kelvin/minute.

It is possible that the temperature interval between the start of the melting operation and the end of the melting operation as determinable by the above DSC protocol is ≤80° C., preferably ≤60° C. and more preferably ≤50° C.

In a further preferred embodiment, the production of the article by means of the additive manufacturing method comprises the steps of:
  applying a layer of particles comprising the construction material onto a target surface;
  introducing energy into a selected portion of the layer corresponding to a cross section of the article such that the particles in the selected portion are bonded;
  repeating the steps of applying and introducing energy for a multitude of layers, such that the bonded portions of the adjacent layers become bonded in order to form the article.

This embodiment concerns a powder sintering or powder melting process. If the number of repetitions is sufficiently low, the article to be constructed may also be referred to as a two-dimensional article. Such a two-dimensional article can also be characterized as a coating. For example, for construction thereof, ≥2 to ≤20 repetitions for applying and introduction of energy may be conducted. The energy source for bonding of the particles may be electromagnetic energy, for example UV to IR light. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles of the particles to one another.

In a further preferred embodiment, at least one of the thermoplastic materials in the construction material is a thermoplastic polyurethane elastomer obtainable from the reaction of a polyisocyanate component and a polyol component, said polyol component comprising a polyester polyol having a no-flow point (ASTM D5985) of ≥25° C. More particularly, the polyol component includes a polyester polyol having a no-flow point (ASTM D5985) of ≥25° C. to ≤90° C., preferably ≥35° C. to ≤80° C., more preferably ≥35° C. to ≤55° C. To determine the no-flow point, a test vessel containing the sample is set in slow rotation (0.1 rpm). A flexibly mounted measuring head is immersed in the sample and, on attainment of the no-flow point, is moved away from its position as a result of the abrupt increase in viscosity; the resulting tipping motion triggers a sensor.

Examples of polyester polyols which can have such a no-flow point are reaction products of phthalic acid, phthalic anhydride or symmetric $\alpha,\omega$-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyester polyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol+hexane-1,6-diol; phthalic acid/anhydride+monoethylene glycol+trimethylolpropane; phthalic acid/anhydride+monoethylene glycol. Preferred polyurethanes are obtained from a mixture containing IPDI and HDI or 4,4'-MDI as the polyisocyanate component and a polyol component containing an abovementioned preferred polyester polyol. Particular preference is given to the combination of a mixture comprising IPDI and HDI as polyisocyanate component with a polyester polyol formed from adipic acid+butane-1,4-diol+hexane-1,6-diol for formation of the polyurethanes.

Preferred polyester polyols are further obtainable by ring-opening lactone polymerization, more preferably based on epsilon-caprolactone.

It is further preferable that these polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyester polyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of the complex viscosity 10 (determined by viscometry measurement in the melt with a plate/plate oscillation viscometer according to ISO 6721-10 at 100° C. and a shear rate of 1/s) of ≥4000 Pas to ≤160 000 Pas.

A further example of a suitable polyurethane is:

1. Substantially linear polyester polyurethanes having terminal hydroxyl groups as described in EP 0192946 A1, prepared by reaction of a) polyester diols of molecular weight above 600 and optionally b) diols from the molecular weight range from 62 to 600 g/mol as chain extenders with c) aliphatic diisocyanates, observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1, it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1, it is further preferable that component c) contains IPDI and HDI and/or PDI.

In the polyester polyurethanes mentioned under 1, it is further preferable that their production included use as component b) of alkanediols selected from the group consisting of 1,2-dihydroxyethane, 1,3-dihydroxypropane, 1,4-dihydroxybutane, 1,5-dihydroxypentane, 1,6-dihydroxyhexane and any desired mixtures of these diols in an amount of up to 200 hydroxyl equivalent percent based on component a).

It is further possible that after heating to 100° C. and cooling to 20° C. at a cooling rate of 4° C./min over a temperature interval from 25° C. to 40° C. for ≥1 minute (preferably ≥1 minute to ≤30 minutes, more preferably ≥10 minutes to ≤15 minutes) the thermoplastic elastomer has a storage modulus G' (determined at the respectively prevailing temperature with a plate/plate oscillation viscometer according to ISO 6721-10 at a shear rate of 1/s) of ≥100 kPa to ≤1 MPa and after cooling to 20° C. and storage for 20 minutes has a storage modulus G' (determined at 20° C. with a plate/plate oscillation viscometer according to ISO 6721-10 at a shear rate of 1/s) of ≥10 MPa.

In a further preferred embodiment, at least one of the thermoplastic materials in the construction material is a thermoplastic polyurethane elastomer obtainable from the reaction of the following components:

aa) at least one organic diisocyanate bb) at least one compound having isocyanate-reactive groups and having a number-average molecular weight ($M_n$) of ≥500 g/mol to ≤6000 g/mol and a number-average functionality of the sum total of the components b) of ≥1.8 to ≤2.5 cc) at least one chain extender having a molecular weight (Mn) of 60-450 g/mol and a number-average functionality of the sum total of the chain extenders c) of 1.8 to 2.5.

Preferred diisocyanates aa) are 4,4'-MDI and 1,6-HDI and/or PDI. As NCO-reactive component b) are polyester polyols formed from dicarboxylic acids having 2 to 12 carbon atoms, preferably 4 to 6 carbon atoms, and polyhydric alcohols. Polyester diols bb) used with preference are ethanediol polyadipates, butane-1,4-diol polyadipates, ethanediol butane-1,4-diol polyadipates, hexane-1,6-diol neopentyl glycol polyadipates, hexane-1,6-diol butane-1,4-diol polyadipates and polycaprolactones.

Chain extenders cc) used with preference are aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol.

A further aspect of the present invention is an article obtainable by a process of the invention, wherein the article has been constructed from a sintered pulverulent construction material, where the construction material comprises a mixture of a multitude of thermoplastic materials that each differ from one another by at least one mechanical property, at least one of the thermoplastic materials is a thermoplastic polyurethane material, and where, in addition, the article in construction direction of the additive manufacturing process used in production thereof has a tensile strength (ISO 527) that amounts to ≥30% (preferably ≥50%, more preferably ≥70%) of the tensile strength (ISO 527) of an injection-molded specimen made of that thermoplastic material present in the construction material which has the lowest tensile strength, where the density of the specimen obtained is included in the calculation as the divisor.

In a preferred embodiment, in the sintered pulverulent construction material, powder particles of different construction materials are bonded to one another by transition zones that contain a mixture of the respective different construction materials, and where, in the cross section of the bonded particles, the transition zones make up≤20% (preferably ≤15%, more preferably ≤10%) of the diameter of one of the bonded particles. These transition zones can be characterized as a polymer blend with a mixture gradient consisting of a physical mixed phase of materials A and B and a chemical mixed phase AB of the construction materials.

EXAMPLES

The present invention is elucidated in detail by the examples which follow, but without being limited thereto. The abbreviations mean:

TPU 1: pulverulent ester-based thermoplastic polyurethane having a glass transition temperature (ISO 6721-1) of −14° C. to −13° C., a Shore A hardness (ISO 868) of the sintered specimen of 87 to 89, a Vicat softening temperature (VST A, ISO 306) of 89° C. to 91° C. and a melting temperature (ISO 11357) of 159° C. to 161° C.

TPU 2: pulverulent ester-based thermoplastic polyurethane having a glass transition temperature (ISO 6721-1) of 3° C. to 5° C., a Shore A hardness (ISO 868) of the sintered specimen of 96 to 98 and a melting temperature (ISO 11357) of 179° C. to 181° C.

Example 1

Mixtures of TPU 1 and TPU 2 were made up in the weight ratios specified in the table below:

| No. | TPU 1 [% by wt.] | TPU 2 [% by wt.] |
|---|---|---|
| 1-1 (comparison) | 100 | 0 |
| 1-2 | 70 | 30 |
| 1-3 | 50 | 50 |
| 1-4 | 30 | 70 |
| 1-5 (comparison) | 0 | 100 |

The powder mixtures and unmixed TPU 1 and TPU 2 were used to produce S2 tensile test specimens by laser sintering (scan speed 300 inches/s) in a 3D printing method. Five tensile test specimens of each of the respective powders/powder mixtures were tested in a tensile test in accordance with DIN 53504. The averages of the results obtained are listed in the following table:

| No. | Elongation at break εB [%] | Density [g/cm$^3$] |
|---|---|---|
| 1-1 (comparison) | 352 | |
| 1-2 | 280 | 0.96 |
| 1-3 | 238 | 0.93 |
| 1-4 | 197 | 0.80 |
| 1-5 (comparison) | 135 | |

A linear relationship is apparent in a good approximation between elongation at break and the mixing ratios of the TPU powders.

The invention claimed is:

1. A process for producing an article, comprising: producing the article via an additive manufacturing method comprising at least partially melting and cooling a construction material comprising a mixture of a multitude of pulverulent thermoplastic polyurethane materials having different Shore hardnesses based on DIN ISO 7619-1, and wherein, after melting and cooling the construction material, the construction material has a Shore hardness between a thermoplastic polyurethane having a greatest Shore hardness and a thermoplastic polyurethane having a smallest Shore hardness of the multitude of pulverulent thermoplastic polyurethanes and/or has an elongation at break between a thermoplastic polyurethane having a greatest elongation at break and a thermoplastic polyurethane having a smallest elongation at break of the multitude of pulverulent thermoplastic polyurethanes.

2. The process as claimed in claim 1, wherein the construction material comprises a first pulverulent thermoplastic material and a second pulverulent thermoplastic material, wherein the first pulverulent thermoplastic material is a first polyurethane material and the second pulverulent thermoplastic material is a second polyurethane material, a polycarbonate material, a polyester material or a polyamide material.

3. The process as claimed in claim 1, wherein the construction material comprises a first pulverulent thermoplastic polyurethane material and a second pulverulent thermoplastic polyurethane material, wherein the first pulverulent thermoplastic polyurethane material has a Shore hardness based on DIN ISO 7619-1 of ≥40 A to ≤90 D, the second pulverulent thermoplastic polyurethane material has a Shore hardness based on DIN ISO 7619-1 of ≥40 A to ≤90 D, and the difference in Shore hardness between the first and second pulverulent thermoplastic polyurethane material is ≥2 A to ≤40 A, ≥2D to ≤60 D, or both.

4. The process as claimed in claim 1, wherein the construction material comprises a first pulverulent thermoplastic polyurethane material, a second pulverulent thermoplastic polyurethane material and a third pulverulent thermoplastic polyurethane material, wherein the first pulverulent thermoplastic polyurethane material has a Shore hardness based on DIN ISO 7619-1 of ≥40 A to ≤90 D, the second pulverulent thermoplastic polyurethane material has a Shore hardness based on DIN ISO 7619-1 of ≥40 A to ≤90 D, the third pulverulent thermoplastic polyurethane material has a Shore hardness based on DIN ISO 7619-1 of ≥40 A to ≤90 D, and the difference in Shore hardness between the first and second pulverulent thermoplastic polyurethane material is ≥2 A to ≤40 A, ≥2D to ≤60 D, or both and the difference in Shore hardness between the second and third pulverulent thermoplastic polyurethane material is ≥5 A to ≤30 A, ≥5 D to ≤30 D, or both.

5. The process as claimed in claim 1, wherein the construction material comprises a multitude of pulverulent thermoplastic polyurethane materials that differ from one another by their elongation at break based on DIN 53504 at 200 mm/min.

6. The process as claimed in claim 5, wherein the construction material comprises a first pulverulent thermoplastic polyurethane material and a second pulverulent thermoplastic polyurethane material, wherein the first pulverulent thermoplastic polyurethane material has an elongation at break based on DIN 53504 at 200 mm/min of ≥200% to ≤800%, the second pulverulent thermoplastic polyurethane material has an elongation at break based on DIN 53504 at 200 mm/min of ≥100% to ≤400%, and the difference in elongation at break between the first and second pulverulent thermoplastic polyurethane material is ≥50 percentage points to ≤700 percentage points.

7. The process as claimed in claim 5, wherein the construction material comprises a first thermoplastic polyurethane material, a second thermoplastic polyurethane material and a third thermoplastic polyurethane material, wherein the first thermoplastic polyurethane material has an elongation at break based on DIN 53504 at 200 mm/min of ≥200% to ≥600%, the second thermoplastic polyurethane material has an elongation at break based on DIN 53504 at 200 mm/min of ≥200% to ≤600%, the third thermoplastic polyurethane material has an elongation at break based on DIN 53504 at 200 mm/min) of ≥200% to ≤600%, and the difference in elongation at break between the first and second thermoplastic polyurethane material is ≥50 percentage points to ≤100 percentage points and the difference in elongation at break between the second and third thermoplastic polyurethane material is ≥50 percentage points to ≤100 percentage points.

8. The process as claimed in claim 1, wherein the construction material, with regard to its fusible components, has a melting range within the temperature range from ≥30° C. to ≤90° C. based on differential scanning calorimetry with a $2^{nd}$ heating at a heating rate of 20 K/m in.

9. The process as claimed in claim 1, wherein the construction material, with regard to its fusible components, has a melting range within the temperature range from ≥100° C. to ≤240° C. based on differential scanning calorimetry with a $2^{nd}$ heating at a heating rate of 20 K/m in.

10. The process as claimed in claim 1, further comprising:
    applying a layer of particles comprising the construction material to a target surface;
    introducing energy into a selected portion of the layer corresponding to a cross section of the article such that the particles in the selected portion are bonded;
    repeating applying a layer of particles and introducing energy for a multitude of layers, such that bonded portions of adjacent layers become bonded to form the article.

11. The process as claimed in claim 1, wherein at least one of the thermoplastic materials of the construction material is a thermoplastic polyurethane elastomer obtainable from the reaction of a polyisocyanate component and a polyol component, wherein the polyol component comprises a polyester polyol having a no-flow point of ≥25° C. based on ASTM D5985.

12. The process as claimed in claim 1, wherein at least one of the thermoplastic materials of the construction material is a thermoplastic polyurethane elastomer obtainable from the reaction of the following components:
    a) at least one organic diisocyanate
    b) at least one compound having isocyanate-reactive groups and having a number-average molecular weight ($M_n$) of ≥500 g/mol to ≤6000 g/mol and a number-average functionality of the sum total of the components b) of ≥1.8 to ≤2.5
    c) at least one chain extender having a molecular weight (Mn) of 60-450 g/mol and a number-average functionality of the sum total of the chain extenders c) of 1.8 to 2.5.

* * * * *

UNITED STATES PATENT AND TRADEMARK OFFICE
CERTIFICATE OF CORRECTION

PATENT NO. : 11,400,646 B2  
APPLICATION NO. : 16/605977  
DATED : August 2, 2022  
INVENTOR(S) : Achten et al.

Page 1 of 1

It is certified that error appears in the above-identified patent and that said Letters Patent is hereby corrected as shown below:

In the Claims

In Column 12, Line 55, please replace the symbol "$\geq$" with "$\leq$" before the text "600%".

Signed and Sealed this  
Thirteenth Day of September, 2022

Katherine Kelly Vidal  
*Director of the United States Patent and Trademark Office*